US012800752B2

(12) United States Patent
Russell et al.

(10) Patent No.: US 12,800,752 B2
(45) Date of Patent: Nov. 17, 2026

(54) ELECTRONIC DEVICES, METHODS, AND SYSTEMS FOR MAPPING COMPANION ELECTRONIC DEVICES USING ULTRA-WIDEBAND ELECTRICAL DEVICE COVERS

(71) Applicant: Motorola Mobility LLC, Chicago, IL (US)

(72) Inventors: Michael E Russell, Lake Zurich, IL (US); Thomas Cohlmia, Chicago, IL (US); Wayne G Morrison, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 219 days.

(21) Appl. No.: 18/798,461

(22) Filed: Aug. 8, 2024

(65) Prior Publication Data

US 2026/0043915 A1 Feb. 12, 2026

(51) Int. Cl.
*G01S 13/89* (2006.01)
*G01S 13/02* (2006.01)
(Continued)

(52) U.S. Cl.
CPC .......... *G01S 13/89* (2013.01); *G01S 13/0209* (2013.01); *G01S 13/06* (2013.01); *G06V 20/60* (2022.01); *H04B 17/318* (2015.01)

(58) Field of Classification Search
None
See application file for complete search history.

(56) References Cited

U.S. PATENT DOCUMENTS 5,361,070 A * 11/1994 McEwan ................. G01S 13/18 342/21
10,869,166 B2 12/2020 Tyagi et al.
(Continued)

FOREIGN PATENT DOCUMENTS

| | | | | |
|---|---|---|---|---|
| CN | 114114224 A | * | 3/2022 | ............ H04W 24/08 |
| EP | 4287699 A1 | * | 12/2023 | ........... G01S 13/765 |
| KR | 20210071540 A | * | 6/2021 | .......... H04W 64/006 |

OTHER PUBLICATIONS

"Introducing the New Galaxy SmartTag+: The Smart Way to Find Lost Items", Published Apr. 8, 2021; Available online at https://news.samsung.com/us/introducing-the-new-galaxy-smarttag-plus/.
(Continued)

*Primary Examiner* — Bernarr E Gregory
(74) *Attorney, Agent, or Firm* — Philip H. Burrus, IV

(57) ABSTRACT

An electronic device includes a device housing configured as a cover for an electrical box, a power adaptor to receive power from components within the electrical box, and an ultra-wideband component powered by the power adaptor. The ultra-wideband component communicates with at least one electronic device to perform an ultra-wideband ranging process. A method involves capturing images of another electronic device within the environment, determining the location of the other electronic device using ultra-wideband ranging, creating a visual depiction of the environment and the device's location, and presenting this depiction on a user interface. The system enhances smart home applications by integrating ultra-wideband technology into light switch and outlet covers, providing precise location tracking and continuous operation without battery replacements.

20 Claims, 7 Drawing Sheets

(51) Int. Cl.

| | |
|---|---|
| ***G01S 13/06*** | (2006.01) |
| ***G06V 20/60*** | (2022.01) |
| ***H04B 17/318*** | (2015.01) |

(56) References Cited

U.S. PATENT DOCUMENTS

| | | | | |
|---|---|---|---|---|
| 11,710,285 | B1 * | 7/2023 | Contreras | G06T 19/006 345/633 |
| 2007/0194978 | A1 * | 8/2007 | Teshirogi | H01Q 9/27 342/28 |
| 2007/0268958 | A1 * | 11/2007 | Oda | H04B 1/71632 375/E1.001 |
| 2020/0053689 | A1 * | 2/2020 | McQueen | H04W 64/003 |
| 2020/0284897 | A1 * | 9/2020 | Padaki | G01S 7/006 |
| 2020/0301378 | A1 * | 9/2020 | McQueen | G05B 15/02 |
| 2020/0389763 | A1 * | 12/2020 | Yoon | G01S 5/06 |
| 2021/0003685 | A1 * | 1/2021 | Hong | G01S 5/011 |
| 2021/0250061 | A1 * | 8/2021 | Yoon | G01S 13/32 |
| 2022/0303680 | A1 * | 9/2022 | Ahmed | H04R 3/12 |
| 2022/0303819 | A1 * | 9/2022 | Alex | H04L 69/22 |
| 2023/0078485 | A1 | 3/2023 | Russell et al. | |
| 2023/0079580 | A1 | 3/2023 | Russell et al. | |
| 2023/0168343 | A1 | 6/2023 | Russell et al. | |
| 2023/0169839 | A1 | 6/2023 | Russell et al. | |
| 2023/0171298 | A1 | 6/2023 | Russell et al. | |
| 2023/0217210 | A1 | 7/2023 | Russell et al. | |
| 2023/0217215 | A1 | 7/2023 | Russell et al. | |
| 2024/0144707 | A1 | 5/2024 | Russell et al. | |

OTHER PUBLICATIONS

Haselton, Todd , “Here’s How Apple’s AirTag trackers compare to Tile, and why the company is so upset with Apple”, Published Apr. 27, 2021 online at https://www.cnbccom/2021/04/27/apple-airtags-versus-tile-tracker-how-they-compare.html#:~:text=Apple’s%20AirTag%20is%20similar%2C%20except,of%20tracker%20sizes%20and%20shapes.

* cited by examiner

ELECTRONIC DEVICES, METHODS, AND SYSTEMS FOR MAPPING COMPANION ELECTRONIC DEVICES USING ULTRA-WIDEBAND ELECTRICAL DEVICE COVERS

BACKGROUND

Technical Field

This disclosure relates generally to electronic devices, and more particularly to electronic devices operable with companion electronic devices.

Background Art

Ultra-wideband technology, commonly referred to as "UWB," was approved by the Federal Communications Commission (FCC) for commercial applications in the early 2000s. Several organizations, including the Institute of Electrical and Electronics Engineers (IEEE) and WiMedia Alliance, have adopted ultra-wideband protocols for high-speed data transmission. While failing to gain significant initial traction in the consumer market, the technology has experienced a recent resurgence, particularly with the adoption of the 802.15.4z standard for accurate relative position tracking. As UWB technology becomes more prevalent in mobile devices and consumer electronics, it would be advantageous to have improved commercial applications for the same.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
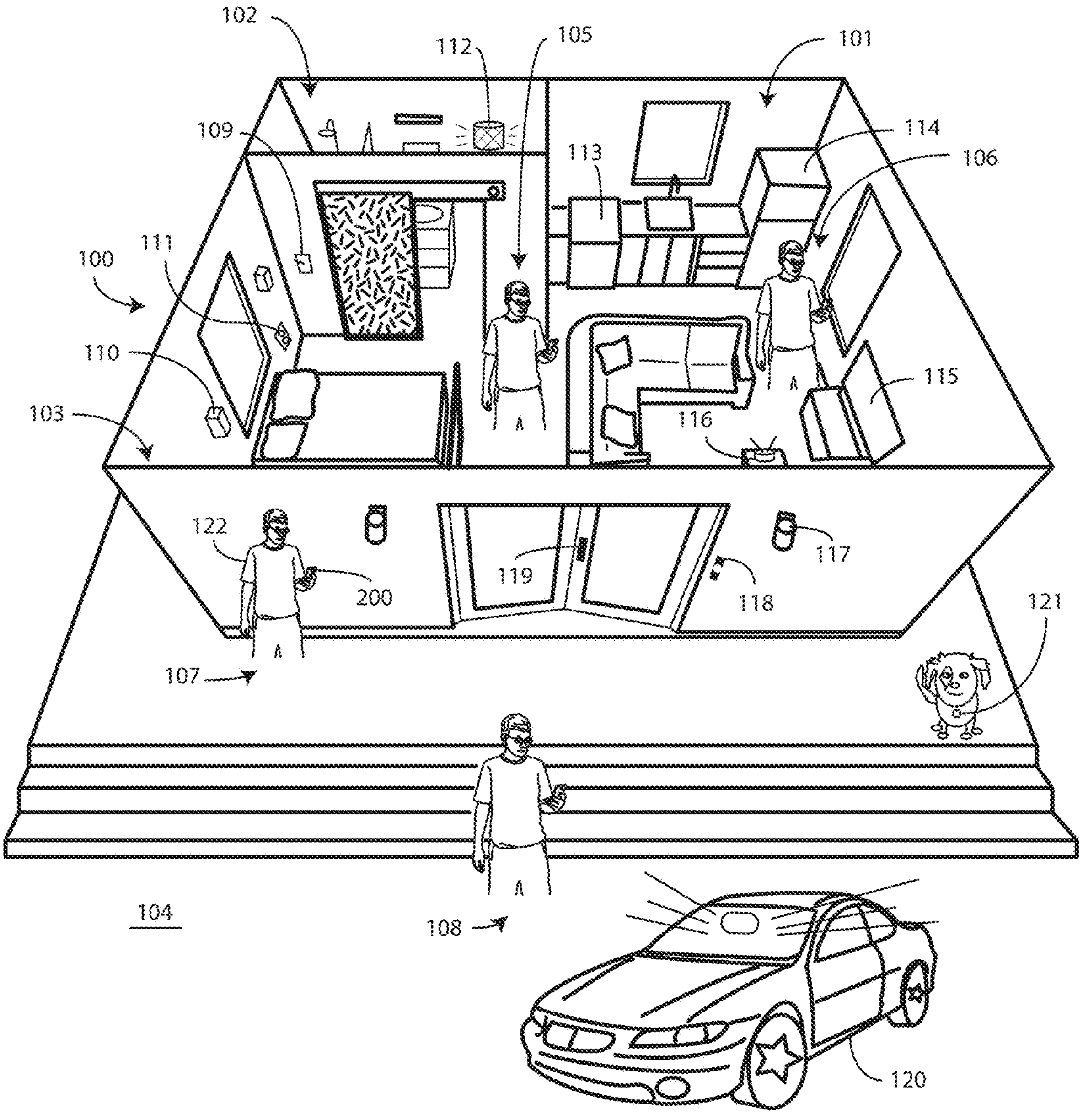
FIG. 1 illustrates one explanatory ultra-wideband ecosystem in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to capturing, with an image capture device, one or more images of another electronic device situated within an environment, determining, with a ultra-wideband component, a location of the other electronic device using an ultra-wideband ranging process, and creating a visual depiction of the environment and the location of the other electronic device for presentation to a user as a map. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of determining, with a ultra-wideband component, a location of another electronic device using a ultra-wideband ranging process, creating a visual map of the environment showing the location of the electronic device, and presenting the map as a visual depiction to a user using a user interface as described herein. The non-processor circuits may include, but are not limited to, a radio receiver, a radio transmitter, signal drivers, clock circuits, power source circuits, and user input devices. As such, these functions may be interpreted as steps of a method to perform, when an electronic device is in communication with an electrical device cover comprising an ultra-wideband component, creating a map of companion electronic devices situated within an environment by capturing pictures of the device and using the electrical device covers and an ultra-wideband ranging process to determine locations of the companion electronic devices within the environment.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, ultra-wideband technology has been available for several years. Despite failing to gain significant traction in the consumer market for high-speed data transmission, recently, ultra-wideband technology has experienced a resurgence with the adoption of the 802.15.4z standard for accurate relative position tracking.

Embodiments of the disclosure contemplate that ultra-wideband technology offers ranging processes that provide for the detection of highly precise positioning. To with, ultra-wideband ranging processes can achieve ranging accuracy within ten centimeters and angular precision within three degrees through specific measurement techniques. Moreover, these measurements can be conducted over distances up to one hundred meters using Impulse Radio techniques in the 6-10 GHz frequency range. Indeed, the IEEE 802.15.4 standard has enhanced ultra-wideband positioning accuracy and security, incorporating features such as scrambled timestamp sequences and cryptographically secure pseudo-random number generation. Intelligent devices can leverage ultra-wideband to gain secure spatial awareness, transforming capabilities in smart home environments, enterprises, transportation, retail, and healthcare markets.

As ultra-wideband technology becomes more prevalent in mobile devices and consumer electronics, embodiments of the disclosure contemplate that there is a demand by consumers to better integrate the benefits of this ultra-wideband location detection in their homes. However, embodiments of the disclosure also contemplate that it can be expensive and time consuming to fully retrofit a house with ultra-wideband compliant electronic components so that the homeowner can utilize ultra-wideband's secure spatial location capabilities.

Previous solutions involved using battery-powered ultra-wideband tags for device location mapping. However, these solutions suffer from many drawbacks. Illustrating by example, these solutions all require periodic battery changes. What's more, most all face coverage gaps.

Advantageously, embodiments of the disclosure provide a solution to this problem by configuring an electrical device cover, suitable for covering a light switch, outlet, or other similar components situated within an electrical box, that includes an ultra-wideband component. Embodiments of the disclosure contemplate that embedding ultra-wideband technology in such covers is advantageous because the electrical components situated within the electrical boxes are generally connected to a continuous alternating current power source. Accordingly, by equipping the cover with an ultra-wideband component, this allows for not only a constant power source for the ultra-wideband component, but also enhances the mapping algorithm due to the large number of outlet covers and light switch covers found in a typical dwelling. Moreover, using simple device covers is cheaper and offers an easier "retrofit" than replacing expensive electronic devices with those offering ultra-wideband communication. Advantageously, embodiments of the disclosure offer a more reliable solution for integrating ultra-wideband into the smart home ecosystem.

In one or more embodiments, an electronic device comprises a device housing configured as a cover for an electrical box. Embodiments of the disclosure contemplate that those of ordinary skill in the art having the benefit of this disclosure will readily understand that the construction term that covers both light switches and outlets is "devices." This term is commonly used in the electrical industry to collectively refer to switches, outlets, and other similar components.

For example, in the context of electrical work, switches and outlets are often referred to as "electrical devices" or simply "devices" that situate within an electrical box when discussing installation, inspection, or maintenance. This terminology is used to encompass a variety of electrical components that control or provide access to electrical power. Additionally, the term "wall plates" or "switch plates" is used to describe the covers that protect and aesthetically finish the installation of these devices, as they can cover both light switches and outlets. Accordingly, as used herein the term "cover" or "cover for an electrical box" is used to refer to a wall plate suitable for covering an outlet or other similar device situated within an electrical box or a switch plate configured to cover a light switch situated in an electrical box. Similarly, "device cover" refers to the same as "devices" is the construction term that broadly covers both light switches and outlets.

In one or more embodiments, the cover comprises a power adaptor carried by the device housing and configured to receive power from components situated within the electrical box. Thus, if the cover is configured as a wall plate the power adaptor of the cover may receive power from a wire or outlet situated within the electrical box. Similarly, if the cover is configured as a switch plate, the power adaptor of the cover may receive power from a feed wire or light switch situated within the electrical box. Other techniques for delivering power to the power adaptor of the cover will be obvious to those of ordinary skill in the art having the benefit of this disclosure.

In one or more embodiments, the cover comprises an ultra-wideband component powered by the power adaptor and situated within the cover itself. In one or more embodiments, the ultra-wideband component is configured to communicate with at least one electronic device to perform an ultra-wideband ranging process. In one or more embodiments, the cover also comprises a peer-to-peer communication device configured to communicate with at least one electronic device to perform a Bluetooth.sup™ channel sounding process.

Advantageously, embodiments of the disclosure the present disclosure embed ultra-wideband technology in light switch and electrical outlet covers. By integrating ultra-wideband components into these covers, the system can leverage the constant power supply from the electrical grid, eliminating the need for battery replacements. This approach ensures continuous operation and reliable location tracking. In one or more embodiments, the ultra-wideband-enabled covers can communicate with mobile devices and other smart home electronics, providing accurate spatial mapping and enhancing the overall smart home experience. This solution offers a cost-effective and efficient method for retrofitting existing homes with ultra-wideband capabilities, paving the way for advanced smart home applications and services.

In one or more embodiments, a method in an electronic device comprises capturing, by an image capture device of the electronic device, one or more images of another electronic device situated within an environment of the electronic device and electronically in communication with a communication device of the electronic device. In one or more embodiments, the method comprises determining, with an ultra-wideband component of the electronic device, a location of the other electronic device using an ultra-wideband ranging process.

In one or more embodiments, one or more processors of the electronic device create a visual depiction of the environment and the location of the other electronic device as a map. In one or more embodiments, a user interface of the electronic device presents the visual depiction of the environment and the location of the other electronic device to a user.

Advantageously, by capturing images of electronic devices within an environment and determining their locations using ultra-wideband ranging processes, the method allows for the creation of a highly accurate spatial map of the environment. This map can be used to label and locate household electronics, enhancing the functionality and user experience of Internet of Things (IoT) applications. The integration of ultra-wideband technology ensures precise positioning within ten-centimeter accuracy and three degrees of angular precision, which is significantly more accurate than traditional Received Signal Strength Indicator (RSSI) based methods.

In one or more embodiments, the method leverages the continuous power supply from electrical outlets and light switches, thereby eliminating the need for battery replacements and ensuring uninterrupted operation. This constant power source allows for reliable and consistent location tracking, which is crucial for applications such as augmented reality-guided experiences, media transfer, and smart home automation.

Additionally, the use of image capture and object recognition in conjunction with ultra-wideband ranging processes provides a comprehensive approach to mapping the environment. This combination allows for the identification and classification of consumer electronics, even those that may be hidden from view, by correlating ultra-wideband measurements with visual data. This results in a more detailed and user-friendly map, which can be used to automate and enhance various smart home experiences.

In one or more embodiments, a method in an electronic device comprises receiving, by a user interface of the electronic device, user input identifying another electronic device situated within an environment of the electronic device and electronically in communication with a communication device of the electronic device. In one or more embodiments, the method comprises determining, with an ultra-wideband component of the electronic device, a location of the another electronic device using an ultra-wideband ranging process.

In one or more embodiments, the method comprises creating, by one or more processors, of the electronic device, a visual depiction of the environment and the location of the another electronic device. In one or more embodiments, the method comprises presenting, by a user interface of the electronic device, the visual depiction of the environment and the location of the another electronic device.

In one or more embodiments, to teach the user to make the map, a user interface of the electronic device can present a prompt instructing that the electronic device be placed upon another electronic device. In one or more embodiments, the user interface then receives, in response to the prompt, additional user input indicating that the electronic device is placed upon the other electronic device prior to determining the location of the other electronic device using the ultra-wideband ranging process.

Advantageously, by incorporating a plurality of other electronic devices such as outlet covers and light switches, the system ensures comprehensive spatial coverage within the environment. This arrangement allows for more accurate and reliable ultra-wideband ranging measurements, as the fixed positions of these devices provide stable reference points for determining the location of other electronic devices. The use of both outlet covers and light switches as part of the ultra-wideband network enhances the robustness of the location mapping, as these devices are typically distributed throughout a home, ensuring that there are multiple points of reference in various rooms and areas.

What's more, embodiments of the disclosure also leverage the existing infrastructure of electrical outlets and light switches, thereby making it easier to retrofit homes with ultra-wideband capabilities without the need for extensive modifications or additional installations. The fixed nature of these devices means they are less likely to be obstructed or moved, providing consistent and reliable data for the ultra-wideband ranging process. This results in a more accurate and detailed map of the environment, which can be used to enhance various smart home applications and services, such as automated IoT experiences and augmented reality-guided interactions.

Other advantages offered by embodiments of the disclosure will be described below. Still others will be obvious to those of ordinary skill in the art having the benefit of this disclosure.

Turning now to FIG. 1, illustrated therein is one explanatory system for environment mapping using one or more electronic devices configured as a cover for an electrical box. Electronic device 111, which is configured as a wall plate in the form of an alternating current electrical outlet cover, is one such cover. Electronic device 109 is configured as a light switch cover or switch plate.

In one or more embodiments, electronic devices 109,111 each comprise a power adaptor carried by a device housing that is configured to received power form components situated within the electrical box and an ultra-wideband component. In one or more embodiments, the ultra-wideband component is powered by the power adaptor and is configured to communicate with an electronic device 200 carried by a user 122.

Figure 4:
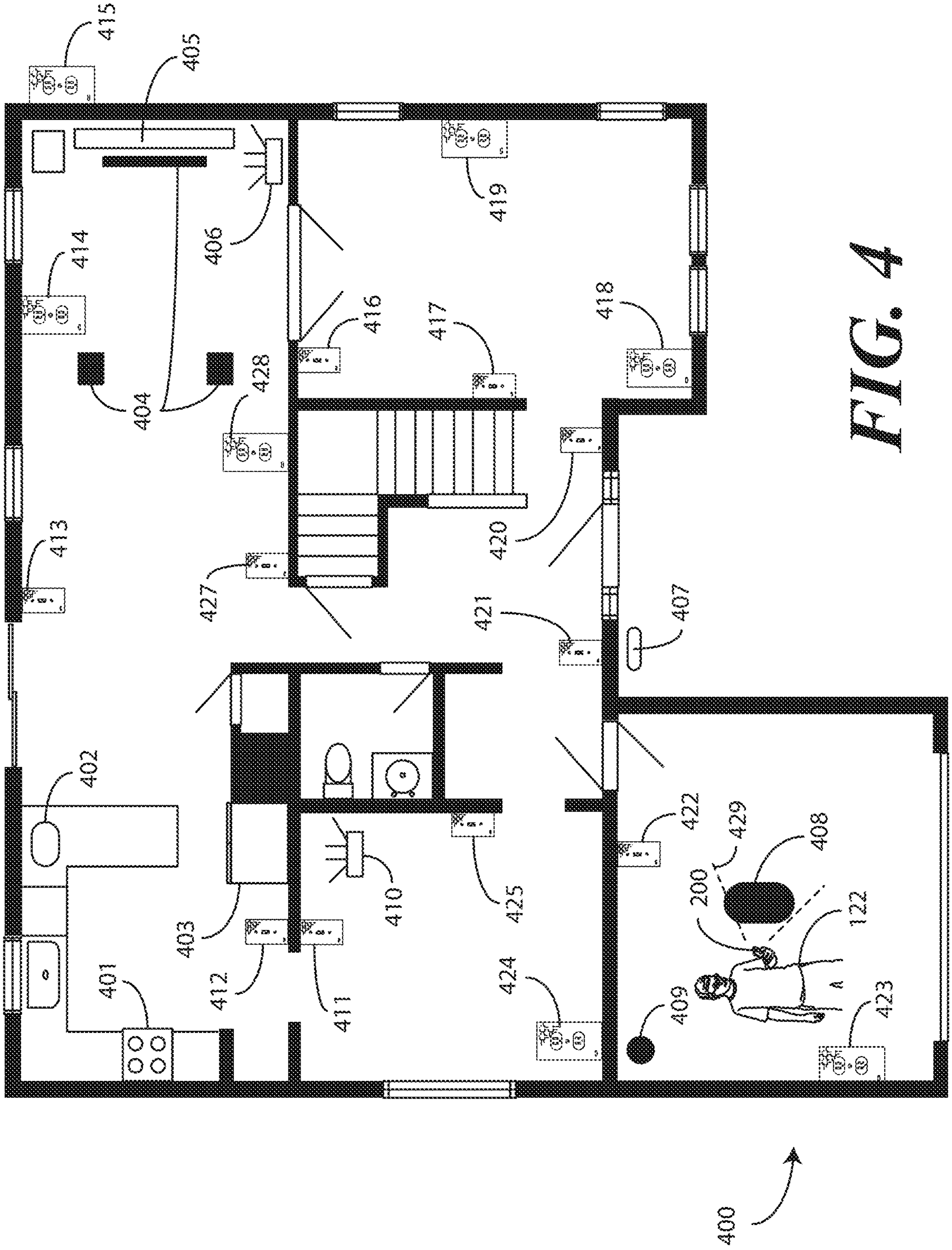
FIG. 4 illustrates another explanatory ultra-wideband ecosystem in accordance with one or more embodiments of the disclosure.

While one wall plate and one switch plate are shown in the system of FIG. 1, it is to be understood that a dwelling 100 such as the house of FIG. 1 would generally have a multitude of such electronic devices, with some being configured as light switch covers, some being configured as outlet covers, and some being configured as other covers for an electrical box. Additionally, it should be noted that while the wall plates and switch plates are shown inside the dwelling 100 in FIG. 1, they could equally be placed outside as well (an example of which is shown in FIG. 4 below), thereby allowing the user 122 to locate objects outside the dwelling such as the vehicle 120, smart lock 119, smart doorbell 117, and dog, as well as the items situated inside the dwelling 100.

As shown in FIG. 1, a user 122 carries an electronic device 200 (which is a smartphone in this illustrative embodiment) and moves from a first location 105 centrally situated within the dwelling 100, a second location 106 situated within the dwelling 100, a first location 107 outside the dwelling 100, a second location 108 situated outside the dwelling 100, and so forth. In one or more embodiments, the smartphone has a companion electronic device mapping manager that determines the location of each wall plate or switch plate carrying an ultra-wideband component within the dwelling 100 as the user 122 moves between these locations 105, 106, 107, 108. In one or more embodiments, the electronic device 200 has an image capture device that also captures one or more images at each location 105, 106, 107, 108.

In one or more embodiments, the companion electronic device mapping manager calculates the relative positions of the wall plates and switch plates with respect to each other using ultra-wideband ranging data, examples of which include time of flight, angle of arrival, and time difference of arrival measurements. The companion electronic device mapping manager can also identify companion electronic devices depicted in the one or more images using image analysis, thereafter correlating locations of the companion electronic devices using the known locations of the wall plates and switch plates also depicted in the one or more images.

In one or more embodiments, based upon the locations and relative positions of the wall plates and switch plates, and therefore the correlated locations of the companion electronic devices, the companion electronic device mapping manager can generate a visual depiction of the dwelling 100. In one or more embodiments, this visual depiction appears as a map or floor plan of the dwelling that can be presented on a user interface of the smartphone. In one or more embodiments, the visual depiction depicts at least the companion electronic devices within the environment. In other embodiments, the visual depiction can also depict the switch plates and wall plates as well.

In one or more embodiments, the smartphone obtains ultra-wideband ranging data from the wall plates and switch plates through in-band session exchanges between the smartphone and these covers. As described above, ultra-wideband technology provides high precision location detection, with accuracy within ten centimeters. This allows the visual depiction generated by the companion electronic device mapping manager to be detailed and accurate. In one or more embodiments, the smartphone can use Wi-Fi and peer-to-peer (e.g., Bluetooth) measurements to enhance the accuracy of the mapping process.

As will be described below, in one or more embodiments the system aims to determine the precise locations and relative positions of companion electronic devices within an environment, such as the smart home, using ultra-wideband technology. The illustrative companion electronic devices of FIG. 1 are situated within a main room 101, a bathroom 102, a bedroom 103, and an exterior 104 of the dwelling 100. These companion electronic devices include smart lights 110, 112, 117 a smart dishwasher 113, a smart refrigerator 114, a smart television 115, a router 116, a smart doorbell 118, a smart lock 119, and a car 120 with an onboard entertainment system.

In one or more embodiments, a companion electronic device mapping manager operating in the smartphone implements a method where an image capture device captures one or more images of other electronic devices situated within the environment of the smartphone as the user 122 moves between locations 105, 106, 107, 108. One or more processors can identify the companion electronic devices depicted in the images, while an ultra-wideband component of the smartphone determines a location of the other electronic devices relative to known locations of wall plates and switch plates determined using an ultra-wideband ranging process.

One or more processors of the smartphone can then create a visual depiction of the environment that includes the locations of the other electronic devices. A user interface of the electronic device then presents the visual depiction to the user 122. Advantageously, the system of FIG. 1 provides a fascinating system that maps the environment and the companion electronic devices situated therein with unprecedented precision.

As the dwelling 100 of FIG. 1 includes, in addition to the companion electronic devices, switch plates and wall plates each comprising a small ultra-wideband component that is powered from the alternating current mains delivering power to the corresponding light switches and outlets. These ultra-wideband components communicate with the companion electronic device mapping manager of the smartphone to create a detailed virtual representation of the space defined by the dwelling 100.

As the user 122 walks through the various locations 105, 106, 107, 108, the companion electronic device mapping manager springs into action. Since ultra-wideband components are embedded into light switch and electrical outlet covers, which provide continuous power, this allows the companion electronic device mapping manager to enhance the mapping algorithm for smart home environments. By integrating ultra-wideband components into these covers, the system leverages the constant power supply from the electrical grid, eliminating the need for battery replacements. This approach ensures continuous operation and reliable location tracking.

The ultra-wideband-enabled covers can communicate with the smartphone and other smart home electronics, providing accurate spatial mapping and enhancing the overall smart home experience. This solution offers a cost-effective and efficient method for retrofitting existing homes with ultra-wideband capabilities, paving the way for advanced smart home applications and services.

In one or more embodiments, the ultra-wideband-enabled covers are distributed throughout the dwelling 100 as covers for light switches and electrical outlets to create a comprehensive ultra-wideband network. This network allows for precise location tracking of various smart home devices and objects. In one or more embodiments, the system can utilize ultra-wideband ranging techniques, such as time-of-flight (ToF), time-difference-of-arrival (TDoA) and angle-of-arrival (AoA) measurements, to determine the exact location of devices within the home. The ultra-wideband-enabled covers can also work in conjunction with other wireless technologies, such as Bluetooth.sup.™ and Wi-Fi, to enhance the accuracy and reliability of the location tracking process.

Additionally, the proposed solution includes a method for mapping the home using a mobile device equipped with ultra-wideband capabilities. The user 122 can walk through the locations 105, 106, 107, 108 of the dwelling 100 with the smartphone, capturing images and ultra-wideband measurements to create a detailed map of the environment. The system can use object recognition and artificial intelligence to classify and label various smart home devices, thereby providing a user-friendly interface for managing and interacting with the smart home ecosystem. This method allows for seamless integration of ultra-wideband technology into existing homes, offering a scalable and flexible solution for enhancing smart home experiences.

In one or more embodiments, the companion electronic device mapping manager determines the exact location of each ultra-wideband-equipped wall plate or switch plate, while also calculating their positions relative to one another. This intricate dance of data is made possible through ultra-wideband ranging techniques, which involve in-band session exchanges between the ultra-wideband wall plates and switch plates and an ultra-wideband radio of the smartphone. The result is a highly accurate three-dimensional map of the dwelling and its contents.

To do this, an image capture device of the smartphone captures one or more images at each location 105, 106, 107, 108. One or more processors of the smartphone then employ a system contextual information analyzer to identify the objects in view, adding another layer of understanding to the mapping process. The companion electronic device mapping manager ingests all this information—the ultra-wideband switch plate and wall plate locations, their relative positions, and the identified objects from the image capture device—and weaves the data together into a comprehensive location association map in the form of a visual depiction. Indeed, the map even includes the dog since he is wearing a smart tag 121.

For the user 122, this map might take the form of a detailed floor plan, showing not just the companion electronic devices but also the walls and layout of the dwelling. Advantageously, this innovative system transforms the user's understanding of indoor spaces, creating a digital twin of the physical environment. Embodiments of the disclosure provide a powerful tool that revolutionizes everything from home automation to asset tracking, bringing a new level of spatial awareness to the user's increasingly connected world.

In one or more embodiments, the process of mapping the ultra-wideband switch plates and wall plates, examples of which include outlet cover 111 and light switch cover 109, as well as associating them with the companion electronic devices situated within the rooms and the exterior of the dwelling 100, begins when the smartphone establishes communicative links with the various companion electronic devices dispersed in each of the rooms and/or outside.

Thereafter, the smartphone connects wirelessly to the smart devices situated within the dwelling 100, thereby setting the stage for data collection. Once the connections are established, communication device of the smartphone scans for device identifying information broadcasted by the smart devices. This information, which includes device names, Bluetooth.sup™ MAC addresses, and received signal strength indications (RSSI), helps the system determine the identity of each smart device. The companion electronic device mapping manager, implemented within the mobile device, receives this data and begins to organize it.

In one or more embodiments, the smartphone then prompts the user 122 activate the image capture device of the smartphone and perform a panoramic snapshot of the environment, optionally from a plurality of locations 105, 106, 107, 108. In one or more embodiments, one or more processors of the smartphone then identify each ultra-wideband switch plate or wall plate within the viewfinder using auto focus technology. In one or more embodiments, the system employs artificial intelligence (AI) and object recognition algorithms to classify consumer electronics visible in the imaging frames.

Once the objects are classified, the user is prompted to walk towards the identified objects. The ultra-wideband component manager of the smartphone takes time-of-flight and angle-of-arrival ranging measurements to multiple installed ultra-wideband switch covers and outlet covers to determine the precise location of the objects of interest relative to the newly installed ultra-wideband covers. Additionally, the system can perform Bluetooth.sup™ Low Energy (BLE) or Wi-Fi measurements to scan and compare received signal strength indications to locate hidden devices, such as a Wi-Fi access point defined by router 116 or BLE subwoofer hidden under the sofa. The system maps RF time-of-flight ranges and RSSIs to the semantic locations of the classified objects.

After collecting the necessary data, the electronic device provides the user with a labeled map of the room developed from ultra-wideband measurements and images taken. The map compares ranging measurements to auto-focus (AF) values for range determination and floor plan accuracy. The system then starts providing ultra-wideband location services with "Follow-Me" capabilities, enhancing the user's interaction with the smart home environment by offering precise and reliable location tracking of household electronics.

Embodiments of the disclosure also provide for a manual placement technique of performing the manual operations. In one or more embodiments, the method for manual placement involves the user 122 utilizing the smartphone application to map the home environment of the dwelling 100.

In one or more embodiments, the user 122 initiates the process by opening the smart home application on the smartphone, which features "Follow-Me" capabilities. The application presents a list of known devices, such as the smart television 115, the smart speakers, and smart lights 110, 112, 117, and so forth. This list can be imported from other smart home applications like Google.sup™ Home, Amazon Alexa.sup™, Leviton.sup™, and Lutron.sup™. In one or more embodiments, the user 122 the selects an object of interest from this list and chooses the "Place in Home" option.

Once the user 122 selects the object of interest, in one or more embodiments the smartphone instructs the user 122 to hold the smartphone against the center of the object and click the "Place" button. The smartphone then takes time-of-flight and angle-of-arrival ranging measurements to multiple installed ultra-wideband wall plates and switch plates to determine the precise location of the object. The smartphone uses these measurements to create a labeled map of the room, developed from ultra-wideband data and images taken by the smartphone. The map compares ranging measurements to auto-focus (AF) values for range determination and floor plan accuracy.

After the mapping process is complete, the application starts providing ultra-wideband location services with "Follow-Me" capabilities. This feature enhances the user's interaction with the smart home environment by offering precise and reliable location tracking of household electronics. The manual placement method ensures that each object is accurately mapped and labeled, providing a comprehensive and user-friendly interface for managing and interacting with the smart home ecosystem.

Thus, in one or more embodiments the proposed solution includes a method for mapping the home using a mobile device equipped with ultra-wideband capabilities. The user 122 can walk through the locations 105, 106, 107, 108 of the dwelling 100 with the smartphone, capturing images and ultra-wideband measurements to create a detailed map of the environment. The system can use object recognition and artificial intelligence to classify and label various smart home devices, thereby providing a user-friendly interface for managing and interacting with the smart home ecosystem. This method allows for seamless integration of ultra-wideband technology into existing homes, offering a scalable and flexible solution for enhancing smart home experiences.

After the mapping process is complete, the application starts providing ultra-wideband location services with "Follow-Me" capabilities. This feature enhances the user's interaction with the smart home environment by offering precise and reliable location tracking of household electronics. The manual placement method ensures that each object is accurately mapped and labeled, providing a comprehensive and user-friendly interface for managing and interacting with the smart home ecosystem.

Before turning to the additional discussions of methods and how embodiments of the disclosure provide the functionalities and configurations of the proposed system for mapping smart home environments using ultra-wideband technology embedded in electrical device covers, a deeper look into the hardware of the electronic device 200 and a cover for an electrical box configured in accordance with one or more embodiments of the disclosure will be provided. Beginning with the electronic device 200, and turning now to FIG. 2, illustrated therein is one explanatory electronic device 200 configured in accordance with one or more embodiments of the disclosure.

Figure 2:
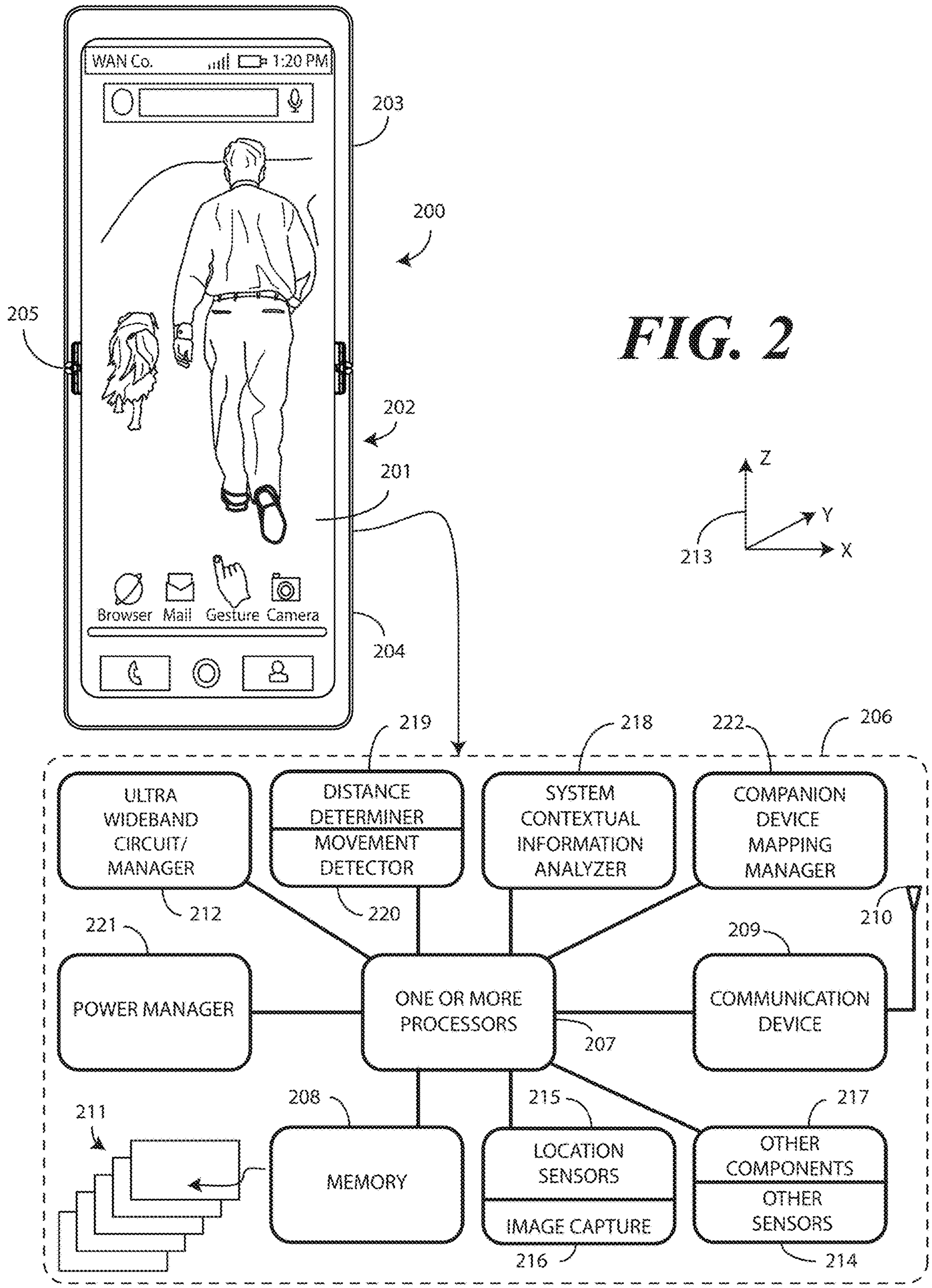
FIG. 2 illustrates one explanatory electronic device in accordance with one or more embodiments of the disclosure.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, such as that associated with the electronic device (101) of FIG. 1, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth.sup™ and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an ultra-wideband component 212. In one or more embodiments, the ultra-wideband component is similar to the communication device 209 in that it is configured to perform wireless communications with one or more other ultra-wideband components that may be integrated into, or attached to, other devices. The illustrative ultra-wideband component of FIG. 2 is a dedicated ultra-wideband transceiver constructed into the electronic device 200 configured to use the one or more antennas 210 or its own antenna structure to communicate, using ultra-wideband technology, with another ultra-wideband component. In one or more embodiments, the ultra-wideband component comprises wireless communication circuitry, one of a receiver, a transmitter, or transceiver, and one or more antennas, which may be separate from, or the same as, the one or more antennas 210 used by the communication device 209.

The inclusion of an ultra-wideband component 212 advantageously allows wireless communication with another ultra-wideband component connected to or integrated into another electronic device, one example of which is an electronic device having a device housing configured as a cover for an electrical box, that is fast and secure, all while requiring very little power. In one or more embodiments, the ultra-wideband component 212 consumes at least an order of magnitude less energy than does the communication device 209.

Ultra-wideband communication is especially well suited to embodiments of the disclosure because it is configured for short-range (within 250 meters) communication, which is well beyond the typical distance that will occur when an electronic device such as the electronic device 200 of FIG. 2 is being used to create a visual depiction of the environment and the location of the another electronic device 200 and to present the visual depiction of the environment and the location of the another electronic device to a user using the user interface.

Additionally, the accuracy of location, and therefore the accuracy of distance measurements, is within a centimeter or less in one or more embodiments. This is in contrast to Bluetooth.sup™ which has an accuracy range of between one and five meters, and is far better than Wi-Fi, which has an accuracy of five to fifteen meters.

Ultra-wideband is also quite reliable, in that it offers strong immunity to multi-path communication channels and interference in the line of sight. It also offers exceptional bandwidth, with data communications occurring at up to 27 Mbps, which is in contrast to the 2 Mbps provided by Bluetooth.sup™. Ultra-wideband is also very low latency, with typically latencies being less than a millisecond, which is in contrast to the several seconds of latency that can occur with Bluetooth.sup™.

In one or more embodiments, the ultra-wideband component 212 can also be used to measure angle of arrival. Effectively, when the one or more antennas 210 are configured as an antenna array, the ultra-wideband component 212 can compare signals received from one side of the antenna array with other signals received from another side of the antenna array to determine an orientation of the electronic device 200 in three-dimensional space 213 relative to a content presentation companion device having another ultra-wideband component attached thereto or integrated therein.

Thus, angle of arrival measures the phase difference between two receive antennas of an antenna array to determine the amount of relative angle offset between the antenna array and a source of the signals. If two devices are situated normal to each other, then the angle of arrival would be either zero or very small. Additionally, this angle of arrival is independent of distance. The angle of arrival measurement is capable of measuring where the electronic device 200 is in relation to another electronic device from which phase differentiated signals are received in terms of elevation and azimuth as well.

To illustrate the independence of distance, if the electronic device 200 is situated normal to another electronic device with an angle of arrival that is zero, this angle of arrival remains zero when the electronic device 200 moves toward, or away from, the other electronic device (without rotating and staying on the same trajectory). It should be noted that an angle of arrival measurement can also measure how parallel the plane of the electronic device 200 and the ultra-wideband antenna array of the other electronic device are arranged (when on bore sight for the two antennas). Again, a zero angle of arrival would mean the two antenna arrays are perfectly parallel and perpendicular to each other. Again, in most situations angle of arrival is relatively independent of distance.

Time-difference-of-arrival techniques can also be used for locating companion electronic devices when a dwelling or other infrastructure is configured with ultra-wideband wall plates and switch plates in accordance with embodiments of the disclosure. Time-difference-of-arrival localization relies on measuring the difference in arrival times of a signal at multiple synchronized reference points, known as anchors. The process involves broadcasting a signal known as a "blink" message, which is received by an anchor, which in the context of the present disclosure would be a ultra-wideband wall plate or switch plate. These anchors record the exact time it receives the blink message. The recorded timestamps are then sent to a central location engine, which can be in the electronic device 200. The location engine uses a multi-lateration algorithm to calculate the position of the tag based on the differences in arrival times of the blink message at the various anchors.

Various sensors 214 can be operable with the one or more processors 207. One example of a sensor that can be included with the various sensors 214 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 214 is a geo-locator that serves as a location detector 215. In one embodiment, location detector 215 is able to determine location data. Location can be determined by capturing the location data from a constellation of one or more earth orbiting satellites, or from a network of terrestrial base stations to determine an approximate location. The location detector 215 may also be able to determine location by locating or triangulating terrestrial base stations of a traditional cellular network, or from other local area networks, such as Wi-Fi networks.

Another example of a sensor that can be included with the various sensors 214 is an orientation detector operable to determine an orientation and/or movement of the electronic device 200 in three-dimensional space 213. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space 213 by, for example, detecting a gravitational direction. In addition to, or instead of, an accelerometer, an electronic compass can be included to detect the spatial orientation of the electronic device 200 relative to the earth's magnetic field. Similarly, one or more gyroscopes can be included to detect rotational orientation of the electronic device 200.

In one or more embodiments, the various sensors 214 also comprise an image capture device 216. In one or more embodiments, the image capture device employs 216 optical detection using image analysis to determine the locations of each companion electronic device. Similarly, the communication device 209 of the electronic device 200 can use received signal strength measurements to determine locations of the various companion electronic devices.

Other components 217 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 217 can also include proximity sensors. The proximity sensors fall in to one of two camps: active proximity sensors and "passive" proximity sensors. Either the proximity detector components or the proximity sensor components can be generally used for gesture control and other user interface protocols.

The other components 217 can optionally include a barometer operable to sense changes in air pressure due to elevation changes or differing pressures of the electronic device 200. The other components 217 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 218 can then be operable with the various sensors to detect, infer, capture, and otherwise determine persons and actions that are occurring in an environment about the electronic device 200. For example, where included one embodiment of the context engine 218 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 218 in detecting multi-modal social cues, emotional states, moods, and other contextual information. The context engine 218 can comprise an artificial neural network or other similar technology in one or more embodiments.

In one or more embodiments, the context engine 218 is operable with the one or more processors 207. In some embodiments, the one or more processors 207 can control the context engine 218. In other embodiments, the context engine 218 can operate independently, delivering information gleaned from detecting multi-modal social cues, emotional states, moods, and other contextual information to the one or more processors 207. The context engine 218 can receive data from the various sensors 214. In one or more embodiments, the one or more processors 207 are configured to perform the operations of the context engine 218.

In one or more embodiments, the electronic device 200 includes a distance determination manager 219 that is operable with the ultra-wideband component 212 to determine a precise distance (within one centimeter) of the electronic device 200 in relation to other electronic devices also having ultra-wideband components or ultra-wideband tags (the difference between a ultra-wideband component and a ultra-wideband tag is that the ultra-wideband component is integrated into an electronic device as an original component, while a ultra-wideband tag is a self-contained ultra-wideband component that can be attached to an electronic device as a retrofit item to configure a legacy electronic device to communicate via ultra-wideband technology).

A motion detector 220 determines when the electronic device 200 moves. While ultra-wideband communication is very conservative with respect to power consumption, embodiments of the disclosure contemplate that the electronic device 200 can be even more efficient in creating the visual depiction of the environment with its corresponding locations of other companion electronic devices when the user moves the electronic device 200 toward those other companion electronic devices while the ultra-wideband circuit manager 212 is actively making distance measurements to the various wall plates and switch plates. Accordingly, the motion detector 200 can be used to detect such motion. In one or more embodiments, a power manager 221 can be configured to ensure that distance measurements, ultra-wideband communications, and other operations are only performed once the electronic device 200 has moved since the last similar operation was performed.

A companion electronic device mapping manager 222 is configured to create a visual depiction of an environment of the electronic device. In one or more embodiments, the visual depiction is configured as a map and includes locations of companion electronic devices situated within that environment. In one or more embodiments, the companion electronic device mapping manager 222 can also be configured to cause a presentation of the visual depiction on a user interface of the electronic device such as the display 201.

In one or more embodiments, the image capture device 216 captures one or more images of another electronic device, such as a companion electronic device, situated within an environment of the electronic device 200. In one or more embodiments, the other electronic device is electronically in communication with the communication device 209 of the electronic device.

In one or more embodiments, the ultra-wideband component circuit manager 212 and its corresponding ultra-wideband component determine a location of the other electronic device using an ultra-wideband ranging process that determines precise locations of outlet covers or light switch covers carrying their own ultra-wideband components that are depicted within the one or more images. In one or more embodiments, the companion electronic device mapping manager 222 then creates a visual depiction of the environment and the location of the other electronic device. A user interface, one example of which is the display 201, can then present the visual depiction to a user.

In one or more embodiments, the location of the other electronic device is determined using the ultra-wideband ranging process by making, with the ultra-wideband component of the ultra-wideband circuit manager 212, a plurality of angle of arrival measurements with a plurality of other electronic devices configured as light switch covers, outlet covers, or other covers for electrical boxes that are situated within the environment of the electronic device 200.

In other embodiments, the location of the companion electronic devices is determined using the ultra-wideband ranging process by making, with the ultra-wideband circuit manager 212 of the electronic device 200, one or both of time of flight measurements and/or time difference of arrival measurements with the plurality of other electronic devices configured as light switch covers, outlet covers, or other covers for electrical boxes that are situated within the environment each having a corresponding ultra-wideband component. Of course, a combination of angle of arrival measurements and time of flight and/or time difference of arrival measurements can be made to determine location as well.

As noted above, in one or more embodiments a method of creating the visual depiction begins by discovering any BLE or ultra-wideband devices within the environment. In one or more embodiments, the user is instructed to turn on the image capture device 216 and perform a panoramic snapshot of the environment. Additionally, the user can be instructed to walk to classified objects while the ultra-wideband circuit manager 212 makes time of flight and angle of arrival ranging measurements to multiple ultra-wideband-equipped wall plates or switch plates.

Accordingly, in one or more embodiments the one or more processors 207 of the electronic device are configured to present a prompt on the user interface instructing the electronic device 200 be moved closer to an identified companion electronic device. In one or more embodiments, this prompt is presented on a user interface such as the display 201 in response to the image capture device 216 capturing the one or more images of the other electronic device. The one or more processors 207 and/or the companion electronic device mapping manager 222 can present this prompt.

In one or more embodiments, the one or more processors 207 are also configured to present a prompt instructing for the one or more images of the environment to be captured by the image capture device 216 to initiate the process. In one or more embodiments, this prompt is presented prior to the image capture device 216 capturing the one or more images of the environment. The one or more processors 207 and/or the companion electronic device mapping manager 222 can present this prompt. In one or more embodiments, the image capture device 216 captures panoramic images of the environment after the presentation of this prompt.

In one or more embodiments, the companion electronic device mapping manager 222 is configured to perform image recognition analysis on the one or more images of the environment to identify the various companion electronic devices situated within the environment. While ultra-wideband communications to the wall plates and switch plates situated near the companion electronic devices is a principal way of determining the location of the companion electronic devices, this can be enhanced using additional data.

Illustrating by example, in one or more embodiments the communication device 209 determines one or more additional locations of one or more additional electronic devices situated within the environment of the electronic device 200 using a Bluetooth channel sounding process. This data can be combined with the ultra-wideband data for a refined location determination. Similarly, in one or more embodiments the communication device 209 determines one or more other locations of one or more other electronic devices using received signal strength indications of one or more communication signals received by the communication device 209 from the one or more other electronic devices.

Thus, when switch plates and wall plates configured to draw power from a utility box intended for an alternating current power outlet or light switch, with a power converter converting the power to operate a microcontroller unit, ultra-wideband radio, and/or BLE radio, the companion electronic device mapping manager 222 can be configured to make location measurements of portable devices and for mapping the space to assign meaningful labels and locations to household electronics for Internet of Things (IoT) applications. The location determination can be achieved using two-way ranging techniques such as time of flight or time difference of arrival.

In one or more embodiments, the companion electronic device mapping manager 222 executes a method for utilizing a fixed-position, "mains-powered" ranging devices to determine the location of a portable ranging device relative to fixed home electronics. In one or more embodiments, the companion electronic device mapping manager 222 labels the fixed home electronics and provides a map of the home for location service applications that automate IoT experiences.

In one or more embodiments, the companion electronic device mapping manager 222 uses the ultra-wideband exchanged with the wall plates or switch plates to create a two-dimensional (2D) or three-dimensional (3D) map of a home. In one or more embodiments, this map is generated by locating other stationary ultra-wideband devices and identifying them, such as televisions, speakers, and light switches, as well as monitoring the location and motion of portable devices like phones, laptops, and tablets with built-in ultra-wideband capabilities as users carry them around the home.

In one or more embodiments, the ultra-wideband component 212 can also perform an ultra-wideband angle of arrival measurement to determine an orientation of the electronic device 200 in three-dimensional space 213. Illustrating by example, the ultra-wideband angle of arrival measurement can be used to determine whether a person holding an electronic device 200, while interacting with a companion electronic device, is facing the companion electronic device or is facing away from the companion electronic device.

Figure 3:
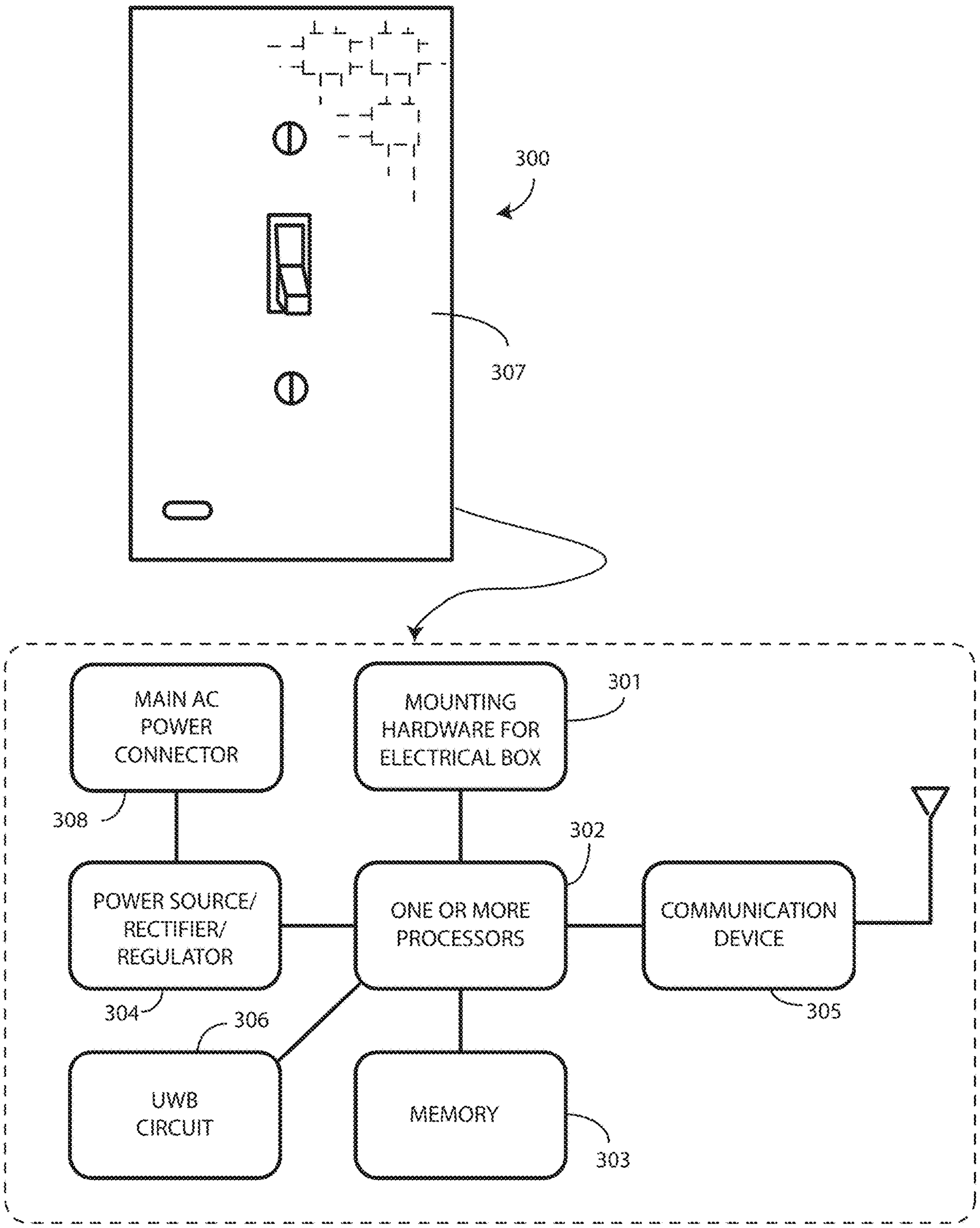
FIG. 3 illustrates one explanatory electrical device cover in accordance with one or more embodiments of the disclosure.

Turning now to FIG. 3, illustrated therein is one explanatory electronic device 300 comprising a device housing configured as a cover for an electrical box. The illustrative electronic device 300 of FIG. 3 is configured as a light switch cover. However, in other embodiments the electronic device 300 is configured as an outlet cover. Other examples of covers for electrical boxes will be obvious to those of ordinary skill in the art having the benefit of this disclosure.

In one or more embodiments, the electronic device 300 mounting hardware 301 suitable for coupling the device housing 307 to an electrical box. In one or more embodiments, the mounting hardware 301 can include various options to ensure secure and reliable attachment to the electrical box.

One option for the mounting hardware 301 shown in FIG. 3 is the use of screws that pass through pre-drilled holes in the device housing 307, aligning with threaded holes in the electrical box. This method provides a robust and stable connection, ensuring that the device remains securely in place during operation.

Another option for the mounting hardware 301 is the use of snap-fit mechanisms. These mechanisms allow the device housing 307 to be quickly and easily attached to the electrical box without the need for tools. The snap-fit design can include flexible tabs or clips that engage with corresponding features on the electrical box, providing a secure and reliable connection. This option is particularly advantageous for installations where speed and ease of assembly are important considerations.

Additionally, the mounting hardware 301 can include adhesive-backed mounting plates. These plates can be affixed to the electrical box using a strong adhesive, and the device housing 307 can then be attached to the mounting plate using screws or snap-fit mechanisms. This option provides flexibility in installation, allowing the device to be mounted in locations where traditional screw-based or snap-fit methods may not be feasible.

In one or more embodiments, a main AC power connector 308 connects to an alternating current feed entering the electrical box. This connection can occur either through the light switch or outlet situated within the electrical box or directly.

In one or more embodiments, the AC power connector 308 delivers power to the power adaptor 304, which converts that power into usable energy for the ultra-wideband component 306. The power adaptor 304 can be configured in various ways to optimize the functionality and efficiency of the power adaptor 304.

One configuration option for the power adaptor 304 includes using a step-down transformer to reduce the high voltage of the alternating current feed to a lower voltage suitable for the ultra-wideband component 306. This method ensures that the ultra-wideband component 306 receives a stable and consistent power supply, which is important for the operation of the ultra-wideband component 306. Another configuration option involves using a switch-mode power supply (SMPS) within the power adaptor 304. The switch-mode power supply can efficiently convert the alternating current to direct current, providing a more compact and lightweight solution. This configuration can also offer higher efficiency and better thermal management, which can be beneficial in maintaining the longevity and performance of the ultra-wideband component 306.

Additionally, the power adaptor 304 can incorporate a rectifier and voltage regulator to ensure that the power delivered to the ultra-wideband component 306 is free from fluctuations and noise. The rectifier converts the alternating current to direct current, while the voltage regulator maintains a constant output voltage, protecting the ultra-wideband component 306 from potential damage due to power surges or drops. These configurations provide reliable and consistent power, enabling the ultra-wideband component 306 to perform accurate location tracking and communication tasks within the smart home environment.

In one or more embodiments, the ultra-wideband component 306 is strategically situated within the device housing 307 to optimize communication and ranging capabilities. The device housing 307, configured as a cover for an electrical box, provides a secure and stable environment for the ultra-wideband component 306. The ultra-wideband component 306 is positioned to ensure minimal interference from other electronic components and to maximize signal strength and accuracy. The placement within the device housing 307 allows the ultra-wideband component 306 to maintain a clear line of sight with other electronic devices, which is essential for accurate ranging measurements.

Mounting techniques for the ultra-wideband component 306 within the device housing 307 include securing the component to an internal mounting bracket or directly to the interior surface of the housing. The mounting bracket can be designed to hold the ultra-wideband component 306 at an optimal angle and orientation, ensuring that the antennas are properly aligned for effective communication. Additionally, the mounting bracket can include vibration-dampening materials to protect the ultra-wideband component 306 from mechanical shocks and vibrations that may occur during installation or operation.

Another mounting technique involves using adhesive-backed mounting plates to affix the ultra-wideband component 306 to the interior surface of the device housing 307. This method provides flexibility in positioning the component, allowing for adjustments to achieve optimal signal strength and accuracy. The adhesive-backed mounting plates can be designed to withstand the environmental conditions within the electrical box, ensuring long-term stability and reliability of the ultra-wideband component 306.

In some embodiments, the ultra-wideband component 306 is integrated into a modular insert that fits securely within the device housing 307. This modular insert can be pre-configured with the necessary connections and mounting points, simplifying the installation process and ensuring consistent placement of the ultra-wideband component 306 across different installations. The modular insert can also include shielding materials to minimize electromagnetic interference from other components within the electrical box, further enhancing the performance of the ultra-wideband component 306.

In some embodiments, the electronic device 300 can include a display. Illustrating by example, where the device housing 307 is configured as a touch-sensitive light switch cover, the device housing 307 may include a touch-sensitive display allowing a user to control a corresponding light with a fingertip.

Additionally, the electronic device 300 can include one or more processors 302, a memory 303, and a communication device 305. The one or more processors 302 are responsible for executing instructions and managing the operations of the electronic device 300. The one or more processors 302 are operatively coupled to the display 301, the memory 303, the power source/rectifier/regulator 304, the communication device 305, and the UWB circuit 306.

The memory 303 stores data and executable instructions for the one or more processors 302. The memory 303 may include volatile memory, such as RAM, and non-volatile memory, such as flash memory or a hard disk drive. The memory 303 provides storage for the software and data used by the electronic device 300.

The communication device 305 enables the electronic device 300 to communicate with other devices and networks. The communication device 305 may support wired or wireless communication protocols, including Wi-Fi, Bluetooth, and other peer-to-peer or ad hoc communication technologies. The communication device 305 includes wireless communication circuitry, a receiver, a transmitter, or a transceiver, and one or more antennas.

The UWB component 306 facilitates ultra-wideband communication with other UWB-enabled devices. The UWB component 306 includes wireless communication circuitry, a receiver, a transmitter, or a transceiver, and one or more antennas. The UWB component 306 enables precise location tracking and secure communication with other UWB components.

It is to be understood that in both FIG. 2 and FIG. 3, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 2 or FIG. 3, or may include a combination of two or more components or a division of a particular component into two or more separate components, and still be within the scope of the present disclosure.

Now that the various hardware components have been described, attention will be turned to methods using this hardware. Turning now to FIG. 4, illustrated therein is another explanatory ultra-wideband ecosystem, shown as the floorplan of a house 400, in accordance with one or more embodiments of the disclosure. The system comprises several components, each playing a role in the overall functionality and integration of ultra-wideband technology within a smart home environment.

In one or more embodiments, the house 400 comprises several ultra-wideband-enabled light switch covers 411, 412, 413, 416, 417, 420, 421, 422, 425, 427. In one or more embodiments, these covers are designed to replace standard light switch covers and includes an embedded ultra-wideband component as described above with reference to FIG. 3.

In one or more embodiments, the ultra-wideband component within the light switch covers 411, 412, 413, 416, 417, 420, 421, 422, 425, 427 is powered by the alternating current mains power supplied to the light switch. The ultra-wideband component is configured to communicate with other ultra-wideband devices within the home, providing precise location tracking and spatial awareness. The light switch covers 411, 412, 413, 416, 417, 420, 421, 422, 425, 427 also include a power adaptor that converts the AC power to a suitable voltage for the ultra-wideband component, ensuring continuous operation without the need for battery replacements.

In addition to these light switch covers 411, 412, 413, 416, 417, 420, 421, 422, 425, 427, the house 400 also includes several ultra-wideband-enabled electrical outlet covers 414, 415, 418, 419, 423, 424, 428. Similar to the light switch covers 411, 412, 413, 416, 417, 420, 421, 422, 425, 427, the electrical outlet covers 414, 415, 418, 419, 423, 424, 428 are designed to replace standard outlet covers and each include an embedded ultra-wideband component.

The ultra-wideband component within the outlet covers 414, 415, 418, 419, 423, 424, 428 is powered by the AC mains power supplied to the electrical outlet. The outlet covers 414, 415, 418, 419, 423, 424, 428 also include a power adaptor that converts the AC power to a suitable voltage for the ultra-wideband component. The ultra-wideband component in the outlet covers 414, 415, 418, 419, 423, 424, 428 communicates with other ultra-wideband devices within the home, providing accurate location tracking and enhancing the smart home ecosystem.

A user 122 is shown in the garage with an electronic device 200 configured in accordance with one or more embodiments of the disclosure. The electronic device 200 is operable with several companion electronic devices situated within the house 400. Examples include a smart garage door opener 408, a smart doorbell 407, a smart speaker 409, one or more routers 406, 410, a smart stove 401, a smart display 402, a smart refrigerator 403, a sound system 404, and a smart television 405. Other examples of companion electronic devices will be obvious to those of ordinary skill in the art having the benefit of this disclosure.

The electronic device 200 held by the user 122 is equipped with an ultra-wideband component and an image capture device. The electronic device 200 is used by the user to map the home environment in one or more embodiments. The ultra-wideband component within the electronic device 200 communicates with the ultra-wideband-enabled light switch covers 411, 412, 413, 416, 417, 420, 421, 422, 425, 427 and electrical outlet covers 414, 415, 418, 419, 423, 424, 428 to determine their precise locations.

The image capture device of the electronic device 200 captures images of the environment, which are used in conjunction with ultra-wideband measurements to create a detailed map of the home that can be presented to the user 122. The electronic device 200 also includes a user interface that presents the visual depiction of the environment and the locations of various electronic devices to the user.

In one or more embodiments, a companion electronic device mapping manager (222) is implemented within the electronic device 200. The companion electronic device mapping manager (222) is responsible for processing the ultra-wideband ranging data and the images captured by the electronic device 200. The companion electronic device mapping manager (222) calculates the relative positions of the ultra-wideband-enabled light switch covers 411, 412, 413, 416, 417, 420, 421, 422, 425, 427 and electrical outlet covers 414, 415, 418, 419, 423, 424, 428, as well as other electronic devices within the home. The companion electronic device mapping manager (222) creates a visual depiction of the environment, which is presented to the user via the user interface of the electronic device 200. This visual depiction includes a map or floor plan of the home, showing the locations of various electronic devices and enhancing the user's interaction with the smart home ecosystem.

A method for creating the visual depiction of the house 400 based upon the ultra-wideband-enabled light switch covers 411, 412, 413, 416, 417, 420, 421, 422, 425, 427 and electrical outlet covers 414, 415, 418, 419, 423, 424, 428 begins by determining the locations of the ultra-wideband-enabled light switch covers 411, 412, 413, 416, 417, 420, 421, 422, 425, 427 and electrical outlet covers 414, 415, 418, 419, 423, 424, 428 in the house 400. Illustrating by example, a companion electronic device mapping manager (222) can determine a location of each of the ultra-wideband-enabled light switch covers 411, 412, 413, 416, 417, 420, 421, 422, 425, 427 and electrical outlet covers 414, 415, 418, 419, 423, 424, 428 in the house 400. In one or more embodiments, the ultra-wideband-enabled light switch covers 411, 412, 413, 416, 417, 420, 421, 422, 425, 427 and electrical outlet covers 414, 415, 418, 419, 423, 424, 428 are located for association with the companion electronic devices situated within the house 400.

In one or more embodiments, ultra-wideband ranging data is obtained as received from the ultra-wideband-enabled light switch covers 411, 412, 413, 416, 417, 420, 421, 422, 425, 427 and electrical outlet covers 414, 415, 418, 419, 423, 424, 428 via in-band session exchanges with the ultra-wideband component (212) of the electronic device 200. For example, the companion electronic device mapping manager 222 can obtains the ultra-wideband ranging data via in-band session exchanges with the ultra-wideband-enabled light switch covers 411, 412, 413, 416, 417, 420, 421, 422, 425, 427 and electrical outlet covers 414, 415, 418, 419, 423, 424, 428.

In one or more embodiments, the user 122 captures one or more images 429 with the electronic device 200 depicting a region of the house 400. In one or more embodiments, the one or more images 429 depict the companion electronic devices situated in that environment. Illustrating by example, the user 122 is capturing one or more images 429 of the smart garage door opener 408 in FIG. 4. One or more processors of the electronic device 200 can identify the companion electronic devices depicted in the one or more images 429 using image analysis.

Thereafter, in one or more embodiments a determination is made as to the relative positions of each of the ultra-wideband-enabled light switch covers 411, 412, 413, 416, 417, 420, 421, 422, 425, 427 and electrical outlet covers 414, 415, 418, 419, 423, 424, 428 with respect to each other. For example, the companion electronic device mapping manager (222) can determine the relative positions of each of the ultra-wideband-enabled light switch covers 411, 412, 413, 416, 417, 420, 421, 422, 425, 427 and electrical outlet covers 414, 415, 418, 419, 423, 424, 428 with respect to each other in the environment based on the ultra-wideband ranging data. Alternatively, or in addition, the companion electronic device mapping manager (222) can determine the locations and relative positions of each of the ultra-wideband-enabled light switch covers 411, 412, 413, 416, 417, 420, 421, 422, 425, 427 and electrical outlet covers 414, 415, 418, 419, 423, 424, 428 in the region of the environment based on the identified objects from the one or more images 429 of the environment.

Thereafter, the companion electronic device mapping manager (222) can generate a visual depiction of the objects in the environment. For example, in one or more embodiments the companion electronic device mapping manager (222) generates the visual depiction of the house 400 and the smart devices and/or the ultra-wideband-enabled light switch covers 411, 412, 413, 416, 417, 420, 421, 422, 425, 427 and electrical outlet covers 414, 415, 418, 419, 423, 424, 428 in the house 400 based on the location and the relative position of each of the ultra-wideband-enabled light switch covers 411, 412, 413, 416, 417, 420, 421, 422, 425, 427 and electrical outlet covers 414, 415, 418, 419, 423, 424, 428 associated with the respective smart devices and objects.

In the illustrative example of FIG. 4, the companion electronic device mapping manager (222) can generate the visual depiction as a floor plan in a three-dimension coordinate system of the house 400, including the location of the smart devices and/or the objects in the building environment. For objects and/or smart devices determined from the one or more images 429 captured by the electronic device 200, the companion electronic device mapping manager (222) generates the visual depiction as a floor plan of the house 400, including the objects and/or the smart devices locations in the house 400, with the floor plan including positions of walls of the building as determined from the captured environment images.

Figure 5:
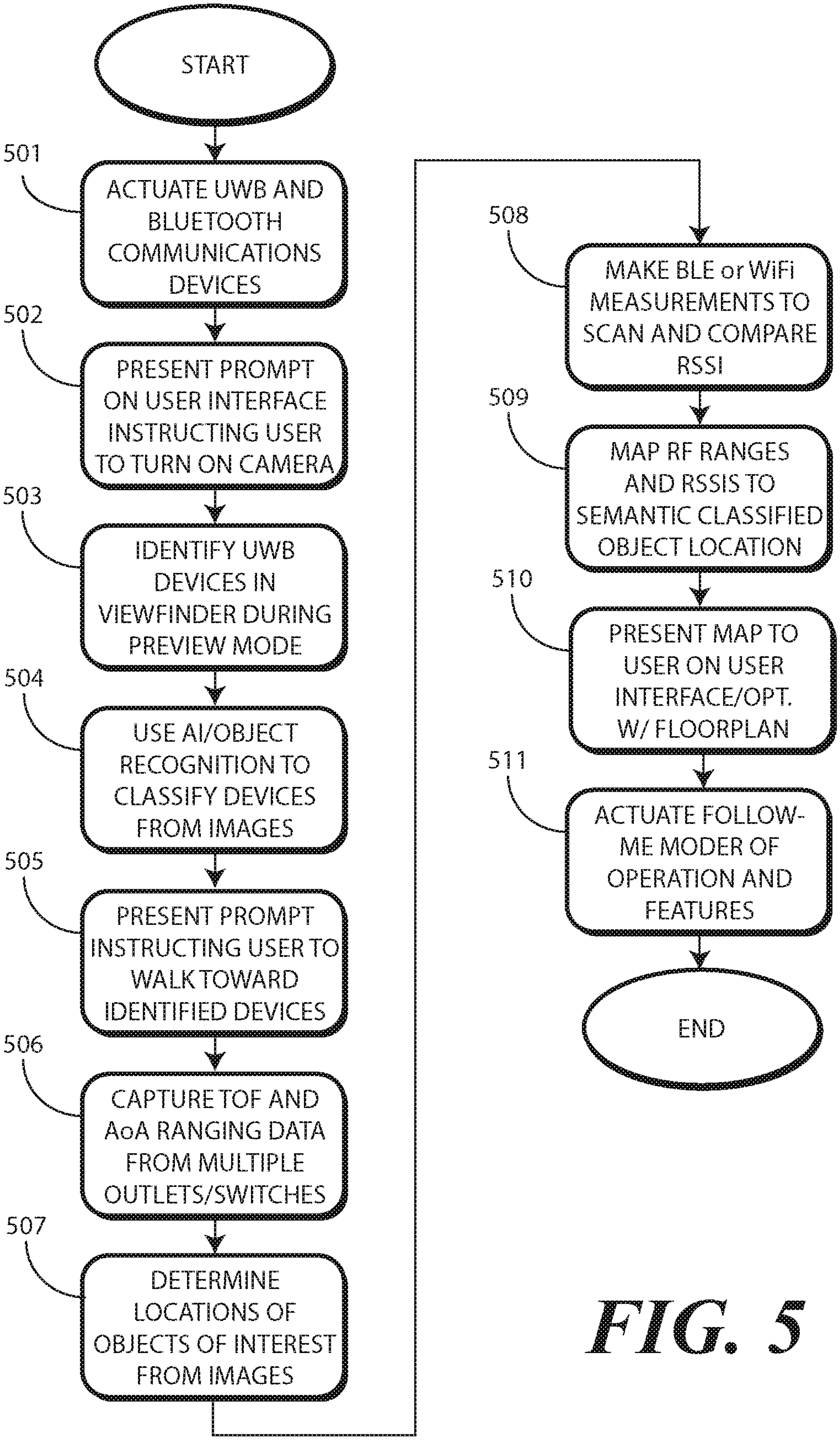
FIG. 5 illustrates one explanatory method in accordance with one or more embodiments of the disclosure.
Figure 6:
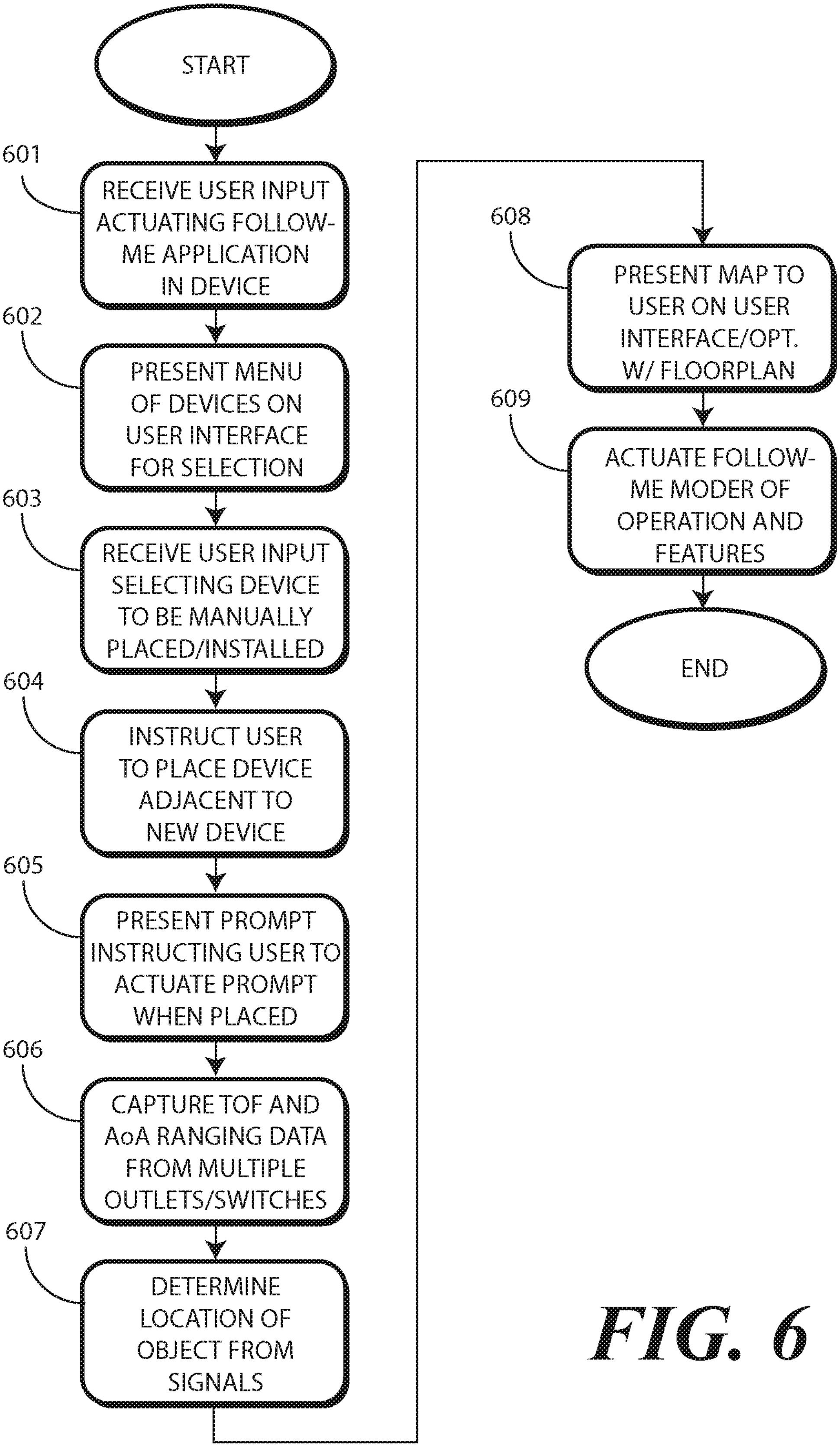
FIG. 6 illustrates another explanatory method in accordance with one or more embodiments of the disclosure.

As noted above, embodiments of the disclosure provide at least two different techniques for creating maps of the house 400. The first includes object recognition from captured images, while the second is a "manual placement" mode. Turning now to FIGS. 5-6, illustrated therein are the two methods, respectively. FIG. 5 illustrates a first method utilizing object recognition to map the home environment. FIG. 6 illustrates a second method involving a manual placement technique for mapping the home environment.

Beginning with FIG. 5, step 501 comprises actuating BLE and ultra-wideband components of an electronic device to begin the discovery of other devices situated within the environment of the electronic device. The process begins with the electronic device discovering Bluetooth Low Energy (BLE) and ultra-wideband (UWB) devices within the vicinity at step 501.

Step 502 then comprises presenting, by one or more processors of the electronic device on a user interface a prompt instructing for one or more other images of the environment to be captured by the image capture device. In one or more embodiments, step 502 occurs prior to the image capture device capturing any images. Accordingly, in one or more embodiments step 502 comprises instructing the user to turn on the camera and perform a panoramic snapshot of the room.

In one or more embodiments, step 503 involves capturing one or more images of an environment using an image capture device of an electronic device. These images may optionally comprise panoramic images, providing a comprehensive view of the environment. In one or more embodiments, the captured images depict at least one other electronic device that is electronically in communication with a communication device of the electronic device capturing the images. This step 503 ensures that the electronic device can identify and map the locations of other electronic devices within the environment accurately.

In addition to capturing images, the same process can be performed in a preview mode of operation of the image capture device. In this mode, the image capture device continuously streams visual data to the electronic device, allowing real-time analysis and identification of other electronic devices within the environment. This preview mode facilitates dynamic and immediate mapping of the environment, enhancing the accuracy and efficiency of the location tracking process.

Regardless of which process is used, at step 504 the system identifies ultra-wideband devices visible in the viewfinder and employs artificial intelligence (AI) and object recognition algorithms to classify consumer electronics within the captured images. Said differently, in one or more embodiments step 504 comprises performing, by the one or more processors, image recognition analysis on the one or more other images of the environment to identify the plurality of other electronic devices.

In one or more embodiments, optional step 505 comprises presenting, by the one or more processors on the user interface, a prompt instructing the electronic device to be moved closer to the another electronic device. This results in the user being prompted to walk towards the classified objects. In one or more embodiments, this occurs in response to the image capture device capturing the one or more images of the another electronic device.

At step 506, the electronic device takes time-of-flight, time-difference-of-arrival, and/or angle-of-arrival ranging measurements to multiple installed ultra-wideband outlet covers and/or ultra-wideband light switch covers to determine locations of objects depicted in the one or more images or preview images. These measurements help determine the precise location of the objects of interest relative to the installed ultra-wideband outlet covers or light switch covers.

In one or more embodiments step 507 comprises determining the location of the other electronic device using the ultra-wideband ranging process by making, with the ultra-wideband component of the electronic device, a plurality of angle of arrival measurements with a plurality of other electronic devices situated within the environment each having a corresponding ultra-wideband component. In other embodiments, step 507 comprises determining the location of the other electronic device using the ultra-wideband ranging process by making, with the ultra-wideband component of the electronic device, one or both of time of flight measurements and/or time difference of arrival measurements with the plurality of other electronic devices situated within the environment each having a corresponding ultra-wideband component. Of course, combinations of these techniques can be used as well.

Optional step 508 can comprise performing BLE or Wi-Fi measurements to locate hidden devices by comparing received signal strength indications. Said differently, in one or more embodiments step 508 comprises determining, using a communication device of the electronic device, one or more additional locations of one or more additional electronic devices situated within the environment of the electronic device using a Bluetooth channel sounding process. Step 508 can comprise determining, using the communication device of the electronic device, one or more other locations of one or more other electronic devices situated within the environment of the electronic device using received signal strength indications of one or more communication signals received by the communication device from the one or more other electronic devices as well.

Step 509 can comprise mapping RF time-of-flight ranges and RSSIs to the semantic locations of the classified objects, providing the user with a labeled map of the room developed from ultra-wideband measurements and images taken. In one or more embodiments, the map compares ranging measurements to auto-focus values for range determination and floor plan accuracy.

The visual depiction can then be presented to a user at step 510. At step 511, the system then starts providing ultra-wideband location services with "Follow-Me" capabilities, enhancing the user's interaction with the smart home environment.

Turning now to FIG. 6, illustrated therein is the manual placement method. Step 601 comprises the user initiating the process. In one or more embodiments, step 601 comprises the user opening the smart home application on the electronic device, which features "Follow-Me" capabilities.

At step 602, the application presents a list of known devices, such as smart televisions, speakers, and lights. In one or more embodiments, this list can be imported at step 602 from other smart home applications like Google.sup™ Home, Amazon Alexa.sup™, Leviton.sup™, and Lutron.sup™. Other techniques for generating this list will be obvious to those of ordinary skill in the art having the benefit of this disclosure.

Step 603 comprises receiving, by a user interface of the electronic device, user input identifying another electronic device situated within an environment of the electronic device. In one or more embodiments, the electronic device identified is electronically in communication with a communication device of the electronic device. In one or more embodiments, the user selects an object of interest from this list at step 603 and chooses the "Place in Home" option.

Optional step 604 comprises presenting, by the user interface of the electronic device, a prompt instructing that the electronic device be placed upon the another electronic device. In one or more embodiments, step 605 comprises receiving, by the user interface in response to the prompt, additional user input indicating that the electronic device is placed upon the another electronic device prior to determining the location of the another electronic device using the ultra-wideband ranging process at step 607. Illustrating by example, the user can be then instructed to hold the electronic device against the center of the object and click the "Place" button.

At step 606, the electronic device takes time of flight, time-difference-of-arrival, and/or angle or arrival ranging measurements to multiple installed ultra-wideband outlet covers and/or light switch covers to determine the precise location of the object. In one or more embodiments, step 606 comprises making, with the ultra-wideband component of the electronic device, time of flight measurements, time difference of arrival measurements, or combinations thereof, with the plurality of other electronic devices situated within the environment.

The system uses these measurements to determine the location of the object at step 607. At step 608, the system uses the location to create a labeled map of the room, developed from ultra-wideband data and images taken by the electronic device. In one or more embodiments, the map compares ranging measurements to auto focus values for range determination and floor plan accuracy. After the mapping process is complete, at step 609 the application starts providing UWB location services with "Follow-Me" capabilities, ensuring that each object is accurately mapped and labeled, thereby enhancing the user's interaction with the smart home ecosystem.

Thus, the method of FIG. 6 comprises receiving, by a user interface of the electronic device, user input identifying another electronic device situated within an environment of the electronic device and electronically in communication with a communication device of the electronic device and determining, with an ultra-wideband component of the electronic device, a location of the another electronic device using an ultra-wideband ranging process. In one or more embodiments, the method comprises creating, by one or more processors, of the electronic device, a visual depiction of the environment and the location of the another electronic device and presenting, by a user interface of the electronic device, the visual depiction of the environment and the location of the another electronic device. In one or more embodiments, the determination of the location of the another electronic device using the ultra-wideband ranging process comprises making, with the ultra-wideband component of the electronic device, a plurality of angle of arrival measurements with a plurality of other electronic devices situated within the environment each having a corresponding ultra-wideband component.

Figure 7:
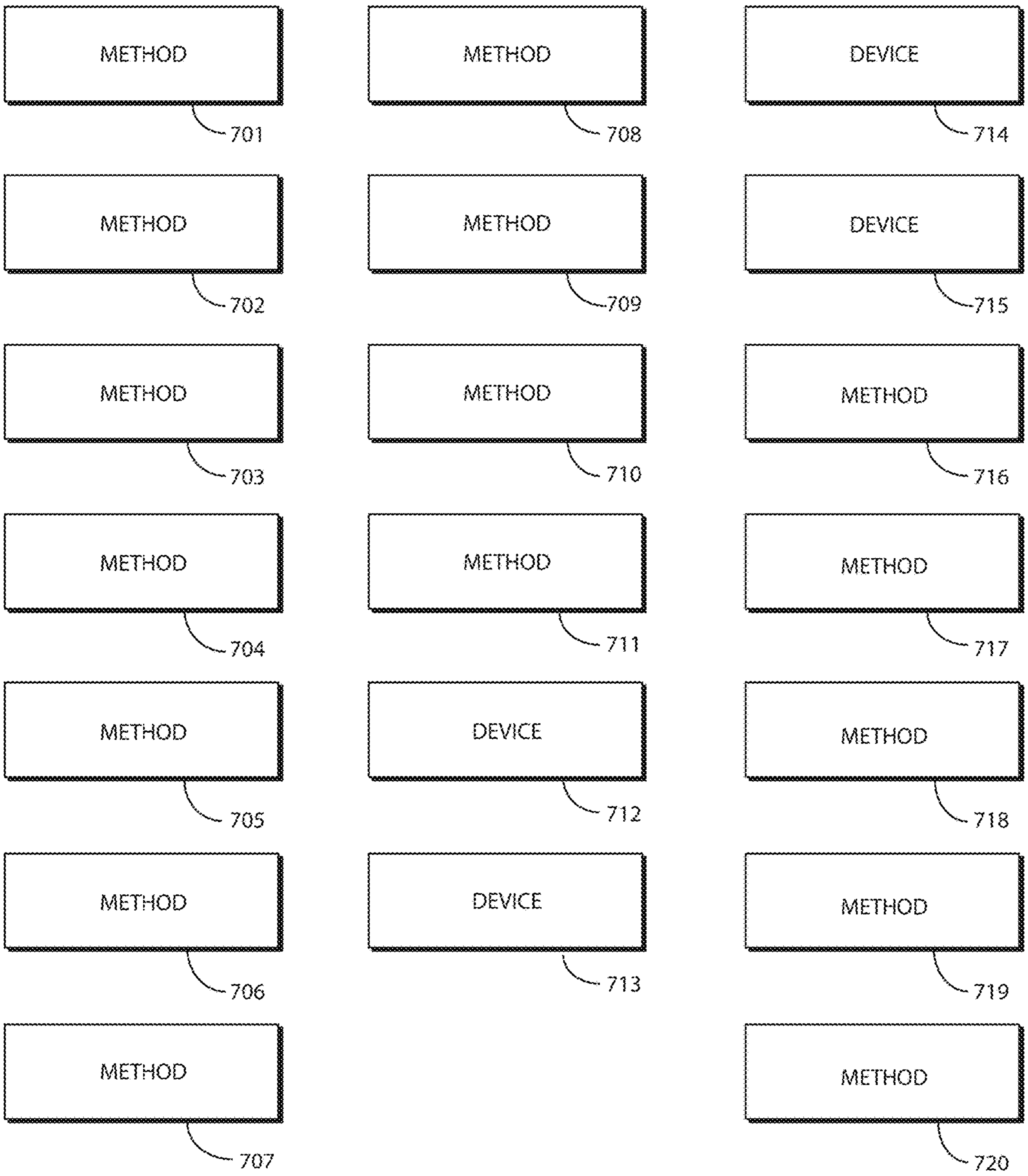
FIG. 7 illustrates one or more embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments. Thus, the embodiments are shown as labeled boxes.

At 701, a method in an electronic device comprises capturing, by an image capture device of the electronic device, one or more images of another electronic device situated within an environment of the electronic device and electronically in communication with a communication device of the electronic device. At 701, the method comprises determining, with an ultra-wideband component of the electronic device, a location of the another electronic device using an ultra-wideband ranging process.

At 701, the method comprises creating, by one or more processors, of the electronic device, a visual depiction of the environment and the location of the another electronic device. At 701, the method comprises and presenting, by a user interface of the electronic device, the visual depiction of the environment and the location of the another electronic device.

At 702, the determining the location of the another electronic device of 701 using the ultra-wideband ranging process comprises making, with the ultra-wideband component of the electronic device, a plurality of angle of arrival measurements with a plurality of other electronic devices situated within the environment each having a corresponding ultra-wideband component. At 703, the plurality of other electronic devices of 702 comprise outlet covers. At 704, the plurality of other electronic devices of 702 comprise light switch covers.

At 705, the determining the location of the another electronic device of 702 using the ultra-wideband ranging process further comprises making, with the ultra-wideband component of the electronic device, one or both of time of flight measurements and/or time difference of arrival measurements with the plurality of other electronic devices situated within the environment each having a corresponding ultra-wideband component. At 706, the method of 705 further comprises presenting, by the one or more processors on the user interface in response to the image capture device capturing the one or more images of the another electronic device, a prompt instructing the electronic device to be moved closer to the another electronic device.

At 707, the method of 705 further comprises presenting, by the one or more processors on the user interface prior to the image capture device capturing the one or more images, a prompt instructing for one or more other images of the environment to be captured by the image capture device. At 708, the one or more other images of the environment of 707 comprise a panoramic image of the environment.

At 709, the method of 707 further comprises performing, by the one or more processors, image recognition analysis on the one or more other images of the environment to identify the plurality of other electronic devices.

At 710 the method of 705 further comprises determining, using a communication device of the electronic device, one or more additional locations of one or more additional electronic devices situated within the environment of the electronic device using a Bluetooth channel sounding process. At 711, the method of 710 further comprises determining, using the communication device of the electronic device, one or more other locations of one or more other electronic devices situated within the environment of the electronic device using received signal strength indications (RSSI) of one or more communication signals received by the communication device from the one or more other electronic devices.

At 712, an electronic device comprises a device housing configured as a cover for an electrical box, a power adaptor carried by the device housing and configured to receive power from components situated within the electrical box, and an ultra-wideband component powered by the power adaptor and situated within the device housing. At 712, the ultra-wideband component is configured to communicate with at least one electronic device to perform an ultra-wideband ranging process.

At 713, the device housing of 712 is configured as a light switch cover. At 714, the device housing of 712 is configured as an alternating current electrical outlet cover. At 715, the electronic device of 712 further comprises a peer-to-peer communication device configured to communicate with at least one additional electronic device to perform a Bluetooth channel sounding process.

At 716, a method in an electronic device comprises receiving, by a user interface of the electronic device, user input identifying another electronic device situated within an environment of the electronic device and electronically in communication with a communication device of the electronic device. At 716, the method comprises determining, with an ultra-wideband component of the electronic device, a location of the another electronic device using an ultra-wideband ranging process. At 716, the method comprises creating, by one or more processors, of the electronic device, a visual depiction of the environment and the location of the another electronic device. At 716, the method comprises presenting, by a user interface of the electronic device, the visual depiction of the environment and the location of the another electronic device.

At 717, the determining the location of the other electronic device of 716 using the ultra-wideband ranging process comprises making, with the ultra-wideband component of the electronic device, a plurality of angle of arrival measurements with a plurality of other electronic devices situated within the environment each having a corresponding ultra-wideband component. At 718, the plurality of other electronic device of 717 comprise one of outlet covers, light switches, or combinations thereof.

At 719, the method of 718 further comprises presenting, by the user interface, a prompt instructing that the electronic device be placed upon the another electronic device; and receiving, by the user interface in response to the prompt, additional user input indicating that the electronic device is placed upon the another electronic device prior to determining the location of the another electronic device using the ultra-wideband ranging process. At 720, the method of 719 further comprises making, with the ultra-wideband component of the electronic device, time of flight measurements, time difference of arrival measurements, or combinations thereof, with the plurality of other electronic devices situated within the environment.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

capturing, by an image capture device of the electronic device, one or more images of another electronic device situated within an environment of the electronic device and electronically in communication with a communication device of the electronic device;

determining, with an ultra-wideband component of the electronic device, a location of the another electronic device using an ultra-wideband ranging process;

creating, by one or more processors, of the electronic device, a visual depiction of the environment and the location of the another electronic device; and presenting, by a user interface of the electronic device, the visual depiction of the environment and the location of the another electronic device.

2. The method of claim 1, wherein the determining the location of the another electronic device using the ultra-wideband ranging process comprises making, with the ultra-wideband component of the electronic device, a plurality of angle of arrival measurements with a plurality of other electronic devices situated within the environment each having a corresponding ultra-wideband component.

3. The method of claim 2, wherein the plurality of other electronic devices comprise outlet covers.

4. The method of claim 2, wherein the plurality of other electronic devices comprise light switch covers.

5. The method of claim 2, wherein the determining the location of the another electronic device using the ultra-wideband ranging process further comprises making, with the ultra-wideband component of the electronic device, one or both of time of flight measurements and/or time difference of arrival measurements with the plurality of other electronic devices situated within the environment each having a corresponding ultra-wideband component.

6. The method of claim 5, further comprising presenting, by the one or more processors on the user interface in response to the image capture device capturing the one or more images of the another electronic device, a prompt instructing the electronic device to be moved closer to the another electronic device.

7. The method of claim 5, further comprising presenting, by the one or more processors on the user interface prior to the image capture device capturing the one or more images, a prompt instructing for one or more other images of the environment to be captured by the image capture device.

8. The method of claim 7, wherein the one or more other images of the environment comprise a panoramic image of the environment.

9. The method of claim 7, further comprising performing, by the one or more processors, image recognition analysis on the one or more other images of the environment to identify the plurality of other electronic devices.

10. The method of claim 5, further comprising determining, using a communication device of the electronic device, one or more additional locations of one or more additional electronic devices situated within the environment of the electronic device using a channel sounding process.

11. The method of claim 10, further comprising determining, using the communication device of the electronic device, one or more other locations of one or more other electronic devices situated within the environment of the electronic device using received signal strength indications (RSSI) of one or more communication signals received by the communication device from the one or more other electronic devices.

12. An electronic device, comprising:

a device housing configured as a cover for an electrical box;

a power adaptor carried by the device housing and configured to receive power from components situated within the electrical box; and an ultra-wideband component powered by the power adaptor and situated within the device housing;

wherein the ultra-wideband component is configured to communicate with at least one electronic device to perform an ultra-wideband ranging process.

13. The electronic device of claim 12, wherein the device housing is configured as a light switch cover.

14. The electronic device of claim 12, wherein the device housing is configured as an alternating current electrical outlet cover.

15. The electronic device of claim 12, further comprising a peer-to-peer communication device configured to communicate with at least one additional electronic device to perform a channel sounding process.

16. A method in an electronic device, the method comprising:

receiving, by a user interface of the electronic device, user input identifying another electronic device situated within an environment of the electronic device and electronically in communication with a communication device of the electronic device;

determining, with an ultra-wideband component of the electronic device, a location of the another electronic device using an ultra-wideband ranging process;

creating, by one or more processors, of the electronic device, a visual depiction of the environment and the location of the another electronic device; and presenting, by a user interface of the electronic device, the visual depiction of the environment and the location of the another electronic device.

17. The method of claim 16, wherein the determining the location of the another electronic device using the ultra-wideband ranging process comprises making, with the ultra-wideband component of the electronic device, a plurality of angle of arrival measurements with a plurality of other electronic devices situated within the environment each having a corresponding ultra-wideband component.

18. The method of claim 17, wherein the plurality of other electronic devices comprises one of outlet covers, light switches, or combinations thereof.

19. The method of claim 18, further comprising:

presenting, by the user interface, a prompt instructing that the electronic device be placed upon the another electronic device; and receiving, by the user interface in response to the prompt, additional user input indicating that the electronic device is placed upon the another electronic device prior to determining the location of the another electronic device using the ultra-wideband ranging process.

20. The method of claim 19, further comprising making, with the ultra-wideband component of the electronic device, time of flight measurements, time difference of arrival measurements, or combinations thereof, with the plurality of other electronic devices situated within the environment.

* * * * *